June 17, 1941.  G. P. KIMMEL  2,245,594
SPECTACLES
Filed Aug. 17, 1938
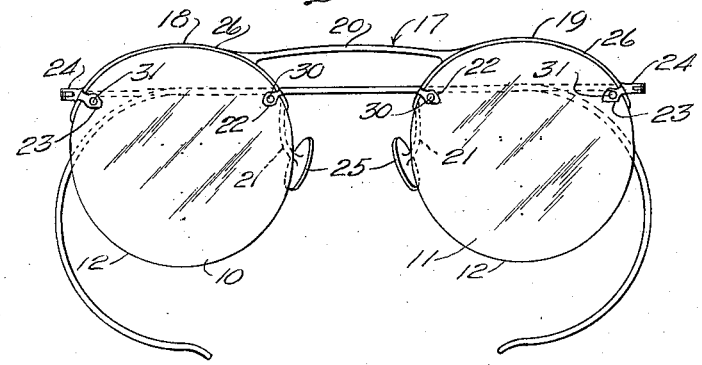
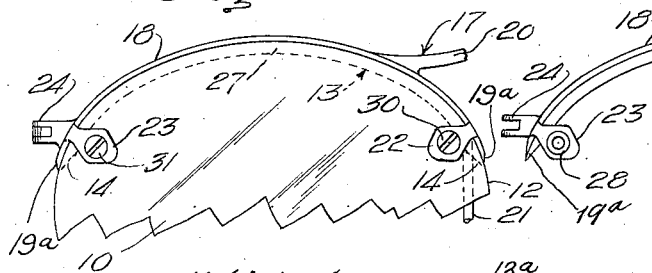 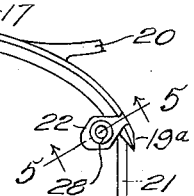
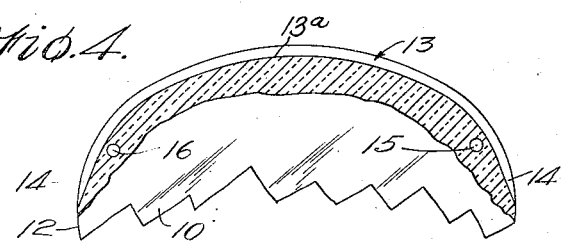 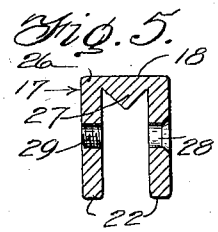
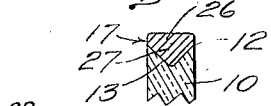 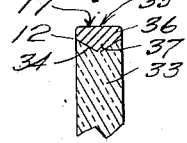 
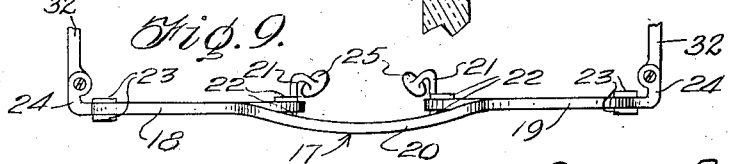
Inventor
GEORGE P. KIMMEL,
By Kimmel & Crowell
Attorneys

Patented June 17, 1941

2,245,594

UNITED STATES PATENT OFFICE 2,245,594

SPECTACLES

George P. Kimmel, Brookeville, Md., assignor to The Ful-Vue Sales Company, Washington, D. C.

Application August 17, 1938, Serial No. 225,466

3 Claims. (Cl. 88—47)

This invention relates to spectacles, and aims to provide a pair of spectacles of the semi-rim type which will give the appearance and effect of a pair of rimless spectacles, but with the strength and rigidity of the endless or full rim type.

The invention further aims to provide in a manner as hereinafter set forth, a pair of spectacles having correlated with the lenses thereof, a mounting set into the upper edge portion of and secured to each lens, whereby when the spectacles are worn they will give substantially the appearance and effect of rimless spectacles, the said mounting rigidly holding the lenses and insuring against breakage or twisting of the lenses out of alignment.

Heretofore spectacles of the semi-rim type have been provided in which the lenses are held either by a single point of attachment or by attachment at a plurality of points, usually one at the nasal side of the lens and one at the temple side, but all of these structures have been subject to the disadvantage that the rim portion of the mounting adjacent the upper edge of the lens gives very little rigidity to the spectacles particularly against twisting thereof. The present invention not only utilizes every possible value of the former semi-rim types but by taking into account the top edge of the lens, gives an unusually strong mounting.

The invention further aims to provide a pair of spectacles comparatively simple in construction and arrangement, strong, durable, compact, readily assembled, thoroughly efficient when worn, and comparatively inexpensive to manufacture.

Embodying the aims aforesaid and others which may directly or indirectly hereinafter appear, the invention consists of the novel construction, combination and arrangement of parts as will be more specifically referred to and illustrated in the accompanying drawing, wherein are shown embodiments of the invention, but it is to be understood that changes, variations and modifications may be resorted to which fall within the scope of the invention as claimed.

In the drawing:

Figure 1 is a front elevation of a pair of spectacles in accordance with this invention, having the temples folded, Figure 2 is a fragmentary view in front elevation and upon an enlarged scale of one of the lenses and showing the latter connected with that portion of the mounting correlated therewith, Figure 3 is a fragmentary view in front elevation and upon an enlarged scale of one of the lens correlated portions of the mounting, Figure 4 is a fragmentary view, upon an enlarged scale in front elevation and lengthwise section of the upper part of a lens, Figure 5 is a section on lines 5—5, Figure 3, Figure 6 is a fragmentary view in vertical section and upon an enlarged scale of one of the lenses and the mounting shown by Figure 1, Figure 7 is a view similar to Figure 6 of a modified form respectively of a lens and mounting, Figure 8 is a view similar to Figure 6 of another modified form respectively of a lens and mounting, and Figure 9 is a top plan view of the spectacles with the temples open and broken away.

With reference to Figures 1 to 6, the lenses of the spectacles are indicated at 10, 11 and each of which is of like form. The edge of each lens is indicated at 12. Each lens is formed with a V-shaped groove 13 in the upper portion of its edge 12. In cross section the outer ends of the walls of the groove 13 are flush with the front and rear faces of the lens. The groove 13 includes an intermediate portion 13ª of uniform depth and a pair of end terminal portions 14 of materially less length than the portion 13ª. The groove 13 is open at each end and has its open ends spaced above the horizontal median of the lens. The end terminal portions 14 of the groove 13 gradually decrease in depth towards the open ends of the groove. Each lens above the open ends of its groove is formed with a pair of horizontal aligned openings 15, 16 located inwardly adjacent of, but in proximity to the base of the groove 13. If found preferable, this groove may be terminated, with respect to the nasal side of the lens, at a point in alignment with the top edge of the bridge portion of the hangers hereinafter described. In such case the flared portion of each hanger will be correspondingly terminated.

There is correlated with the lenses 10, 11 a mounting generally indicated at 17. The mounting includes a pair of spaced parallel hangers 18, 19 of a semi-rim character conforming in front elevation to the contour of the upper portion of the edge of a lens and of a length corresponding to the length of a groove 13; each hanger includes a pair of oppositely disposed end terminal portions 19ª; each has its top and lower faces oppositely beveled; each hanger has its termini positioned above the horizontal median of a lens; a bridge 20 having its ends merging into the nasal side of the hangers above the inner ends of the latter, a nose pad carrying arm 21 integral with and depending from the inner end of each hanger; a pair of spaced parallel inwardly extending apertured lens face straps 22 integral with the lengthwise edges of each hanger on the nasal side of the latter in proximity to its inner end; a pair of spaced parallel inwardly extending apertured lens face straps 23 integral with the lengthwise edges of each hanger on the temple side of the latter in proximity to its outer end and horizontally aligned with the straps 22; and a laterally extending temple connection or end piece 24 integral at its inner end with the temple side of each hanger and which aligns at its inner end with the integral ends of the straps 23. The nose pad arms 21 are shown carrying oppositely extending nose pads 25 which may be integral with or connected to the lower ends of said rims, and which are rearwardly offset with respect to the plane of the lenses when in position on the wearer.

Each hanger, with reference to Figure 6, is formed in cross section of an outer rectangular part or portion 26 and an inner flared part or portion 27 conforming in contour to the cross sectional contour of the groove 13 in a lens edge. The inner part 27 of the hanger completely fills the groove 13. The outer part 26 is arranged exteriorly of the grooved portion of the lens edge. The straps 22, 23 and the arms 21 are integral with the lengthwise edges of the outer parts 26 of the hangers. The temple connection pieces are integral with the upper surface of the parts 26 of the hangers. The straps 22 oppose the outer and inner faces of the lenses. The straps 23 oppose the inner and outer surfaces of the lenses.

One of the straps 22 and one of the straps 23 is formed with a countersunk opening. The other of the straps 22 and the other of the straps 23 is formed with a threaded opening. The construction of each pair of straps is shown in Figure 5 which illustrates the pair of straps 22. The countersunk and threaded openings in the straps 22 are indicated at 28, 29 respectively. Other means may be used in place of the screw thread and screws as for example a solder type rivet.

When the inner parts or portions 27 of the hangers are mounted in the grooves 13 of the lenses, the openings in the straps 22 register with the openings 15 and the openings in the straps 23 register with the openings 16. The pairs of straps 22 are secured against the outer and inner faces of the lenses by the headed holdfast means 30 extending through the countersunk openings in such straps, passing through the openings 15 in the lenses and threadedly engaging with the threaded openings of the straps 22. The pairs of straps 23 are secured against the outer and inner faces of the lenses by headed holdfast means 31 extending through the countersunk openings in straps 23, passing through the openings 16 in the lenses and threadedly engaging with the threaded openings in the straps 23.

The openings 15, 16, pairs of straps 22, pairs of straps 23 and holdfast means 30, 31 anchor the hangers to the lenses. The length of the straps 22, 23 is such as to cause the inner portions 27 of the hangers to be maintained in snug engagement with the walls of the grooves 13 or in other words provide a tight fit between the hangers and lenses. The bridge 20 constitutes a suspension for the hangers.

Connected to the end pieces 24, in a known manner are oppositely disposed temples 32 of any suitable form.

With reference to the modified form shown by Figure 7, the lens 33 is formed in the upper portion of its edge with a V-shape groove 34 which is shallower than the groove 13. In cross section, the outer ends of the walls of the groove 34 are flush with the front and rear faces of a lens. The hanger 35 shown by Figure 7, in cross section consists of an outer rectangular portion 36 and an inner portion 37 corresponding in contour and depth to that of groove 34. Otherwise than that as stated, the form shown by Figure 7 will be the same as the form shown by Figure 1.

With reference to the modified form illustrated by Figure 8, the lens 38 is provided in the upper portion of the edge with a groove 39 of concave cross section. In cross section the ends of the wall of the groove 39 are flush with the front and rear faces of a lens. The hanger 40, shown by Figure 8 in cross section consists of an outer rectangular portion 41 and an inner portion 42 corresponding in contour and depth to that of groove 39. Otherwise than that as stated, the form shown by Figure 8 will be the same as the form shown by Figure 1.

The outer parts of the hangers will be of a thickness to make them barely noticeable when the spectacles are assembled whereby when the latter are worn they will have the appearance and effect of a pair of rimless spectacles. The front and rear faces of the outer parts of the hangers are flush respectively with the front and rear faces of the lenses.

The hangers and straps are so correlated with the lenses to reduce the possibility of the latter breaking to a minimum, and at the same time securely anchoring them to the mounting.

What I claim is:

1. A pair of spectacles including a pair of lenses each having the upper portion of its edge formed with a groove open at each end and of a length to extend onto a part of the temple and nasal sides and to terminate above the horizontal median of the lens, each groove including an intermediate portion of uniform depth throughout and a pair of oppositely disposed end terminal portions gradually decreasing in depth from said intermediate portion to the end termini of the groove, a pair of spaced hangers, each hanger corresponding in length to the length of a groove and formed of an inner part fitted in and a narrow part arranged exteriorly of a said groove of a lens, each hanger including a pair of oppositely disposed reduced end terminal portions having their upper and lower faces oppositely beveled, straps for connecting the lenses to the hangers, said straps being carried by the temple and nasal sides of said hangers and secured to the lenses inwardly adjacent to the end terminal portions of the hangers, and a bridge connecting together the nasal sides of said hangers and spaced from said straps.

2. A pair of spectacles including a pair of lenses each having the upper portion of its edge formed with a groove open at each end and of a length to extend onto a part of the temple and nasal sides and to terminate above the horizontal median of the lens, each groove including an intermediate portion of uniform depth throughout and a pair of oppositely disposed end terminal portions gradually decreasing in depth from said intermediate portion to the end termini of the groove, a pair of spaced hangers, each hanger corresponding in length to the length of a groove and formed of an inner part fitted in and an outer part arranged exteriorly of a said groove, each hanger including a pair of oppositely disposed reduced end terminal portions having their upper and lower faces oppositely beveled, inwardly extending front and rear lens face straps secured at their outer ends to the front and rear faces of the nasal and temple sides of said hangers at the inner ends of the end terminal portions of the latter and at their inner ends to the faces of the lenses, and a bridge connecting together the upper ends of the nasal sides of said hangers and spaced from the outer ends of said straps.

3. A pair of spectacles including a pair of lenses each having the upper portion of its edge formed with a groove open at each end and of a length to extend onto a part of the temple and nasal sides and to terminate above the horizontal median of the lens, each groove including an intermediate portion of uniform depth throughout and a pair of oppositely disposed end terminal portions gradually decreasing in depth from said intermediate portion to the end termini of the groove, a pair of spaced hangers, each hanger corresponding in length to the length of a groove and formed of an inner part fitted in and an outer part arranged exteriorly of a said groove, each hanger including a pair of oppositely disposed reduced end terminal portions having their upper and lower faces oppositely beveled, inwardly extending front and rear lens face straps secured at their outer ends to the front and rear faces of the nasal and temple sides of the outer parts of said hangers at the inner ends of the end terminal portions of the latter and at their inner ends to the faces of the lenses, a bridge connecting together the upper ends of the nasal sides of said hangers and spaced from the outer ends of said straps, and nose pad arms secured to, depending from and offset with respect to the outer ends of those lens straps secured to the rear face of the nasal sides of the outer parts of the hanger.

GEORGE P. KIMMEL.